May 7, 1929.  F. A. DURBIN ET AL  1,712,334
CAR MOVER
Filed July 15, 1927  2 Sheets-Sheet 1
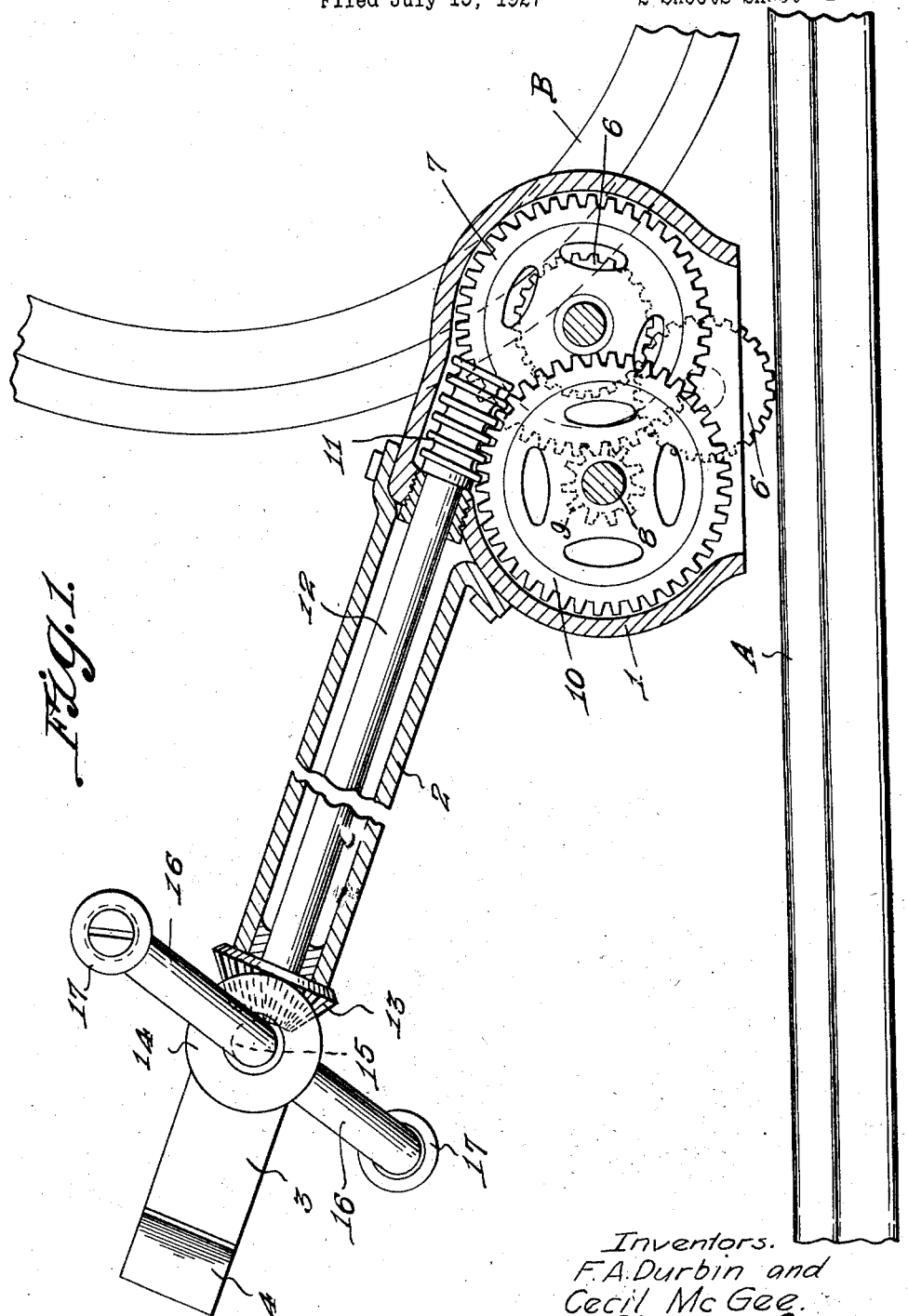
Inventors.
F. A. Durbin and
Cecil McGee.

May 7, 1929.　　F. A. DURBIN ET AL　　1,712,334
CAR MOVER
Filed July 15, 1927　　2 Sheets-Sheet 2
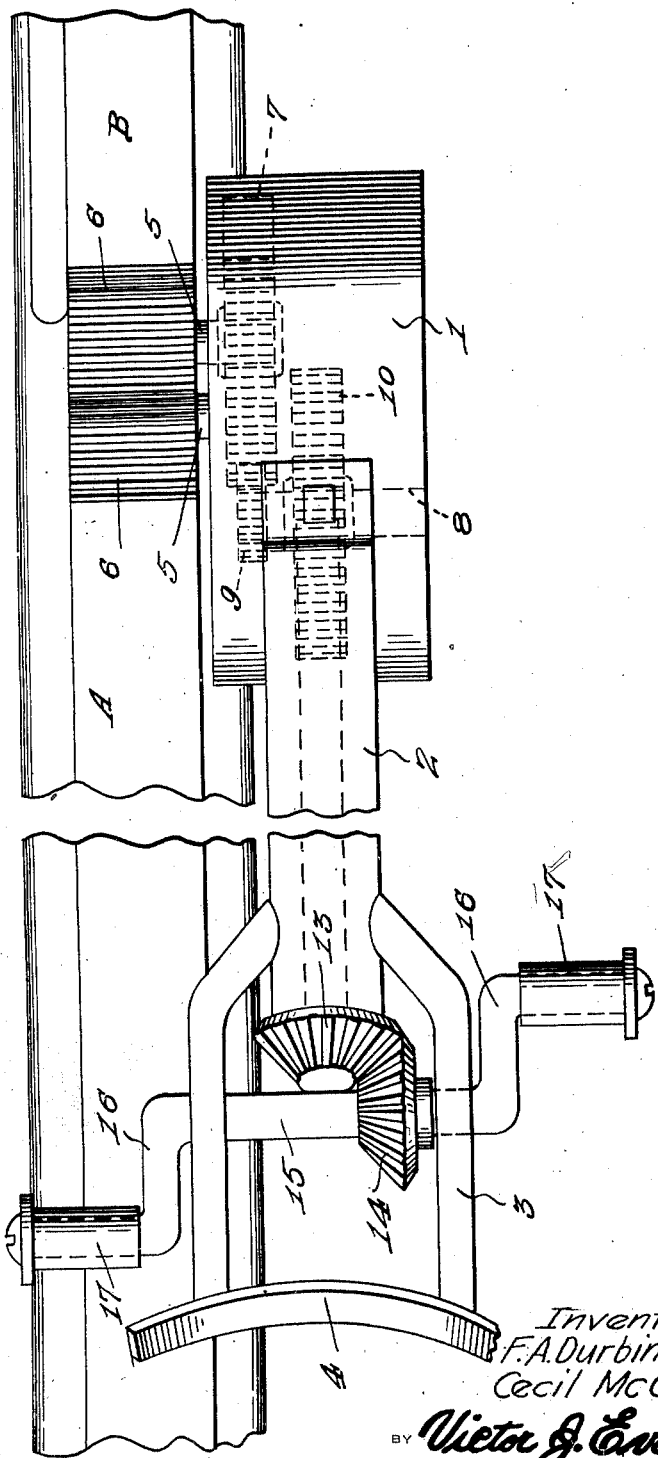

Patented May 7, 1929.

1,712,334

UNITED STATES PATENT OFFICE.

FELIX ARTHUR DURBIN AND CECIL McGEE, OF LOUISVILLE, KENTUCKY.

CAR MOVER.

Application filed July 15, 1927. Serial No. 206,110.

This invention relates to a device for moving cars by hand, the general object of the invention being to provide a casing having a pair of shafts journaled therein, the outer ends of the shafts having toothed wheels thereon that mesh with each other and one of which is adapted to engage a wheel of a car and the other a rail of a track, with means for rotating one of the shafts by hand as the device is pressed against the wheel so that the rotating wheels will move the car with but little effort on the part of the operator.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 1 is a sectional view through the device, showing the same in use.

Figure 2 is a plan view of Figure 1.

In these views, 1 indicates a casing which has an opening in its lower part and 2 indicates a tubular stem which is connected with the upper portion of the casing and extends upwardly and outwardly at an angle from the casing. A pair of arms 3 is fastened to the upper end of the stem 2 and extend beyond the same and the outer ends of these arms are fastened to a breast plate 4. A pair of shafts 5 is journaled in the casing with their outer ends extending beyond the same and each shaft carries a toothed wheel 6 of considerable length, with the wheels meshing with each other. One of the shafts has fastened thereto a toothed wheel 7 which is arranged within the casing and a stub shaft 8 journaled in the casing carries a pinion 9 which meshes with the wheel 7. This shaft 8 also carries a worm gear 10 which meshes with a worm 11 carried by a shaft 12 journaled in the stem and casing, with its upper end projecting from the stem. A bevel gear 13 is fastened to the projecting end of the shaft 12 and meshes with a bevel gear 14 fastened to a shaft 15 journaled in the arms 3 and having its ends cranked, as at 16, each end of the shaft 15 having a handle 17 thereon.

Thus by placing one of the wheels 6 on the rail A of a track and the other wheel 6 against a car wheel B and then pressing upon the breast plate 4 while turning the crank shaft 15, the wheels 6 will be rotated and thus the car will be moved on the track.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

A car mover comprising a casing, a tubular stem connected with the casing, a pair of shafts journaled in the casing and projecting therefrom, a toothed wheel on the outer end of each shaft, the wheels meshing with each other and one of which is adapted to engage a car wheel and the other the rail of a track, a stub shaft journaled in the casing, a worm gear thereon, gears connecting the stub shaft with one of the before mentioned shafts, a shaft passing through the stem, a worm at the inner end of said shaft meshing with the worm gear, a bevel gear on the outer end of the worm shaft, arms connected with the upper end of the stem, a breast plate carried by the arms, a shaft journaled in the arms and having a crank at each end thereof and a bevel gear on said shaft meshing with the before mentioned bevel gear.

In testimony whereof we affix our signatures.

F. A. DURBIN.
CECIL McGEE.